United States Patent
Goss et al.

(10) Patent No.: US 10,719,439 B2
(45) Date of Patent: Jul. 21, 2020

(54) GARBAGE COLLECTION OF A STORAGE DEVICE

(71) Applicant: Seagate Technology LLC, Cupertino, CA (US)

(72) Inventors: Ryan James Goss, Shakopee, MN (US); Siddhartha K. Panda, Bangalore (IN); Daniel J. Benjamin, Shakopee, MN (US); Ryan C. Weidemann, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/696,462

(22) Filed: Sep. 6, 2017

(65) Prior Publication Data

US 2019/0073297 A1    Mar. 7, 2019

(51) Int. Cl.
*G06F 12/00* (2006.01)
*G06F 12/02* (2006.01)
*G06F 3/06* (2006.01)

(52) U.S. Cl.
CPC ........ *G06F 12/0261* (2013.01); *G06F 3/0616* (2013.01); *G06F 3/0619* (2013.01); *G06F 3/0652* (2013.01); *G06F 3/0655* (2013.01); *G06F 3/0659* (2013.01); *G06F 3/0679* (2013.01); *G06F 2212/7205* (2013.01)

(58) Field of Classification Search
CPC .. G06F 12/0261; G06F 3/0679; G06F 3/0619; G06F 3/0655; G06F 3/0652; G06F 3/0616; G06F 3/0659; G06F 2212/7205
See application file for complete search history.

(56) References Cited

U.S. PATENT DOCUMENTS

| | | | |
|---|---|---|---|
| 8,032,724 B1* | 10/2011 | Smith | G06F 12/0269 711/159 |
| 2012/0005406 A1* | 1/2012 | Hutchison | G06F 12/0246 711/103 |
| 2014/0281280 A1* | 9/2014 | Goss | G06F 3/067 711/148 |
| 2015/0006984 A1 | 1/2015 | Strasser et al. | |
| 2015/0032939 A1* | 1/2015 | Gao | G06F 12/0253 711/103 |
| 2015/0242133 A1* | 8/2015 | Smith | G06F 3/0613 711/114 |
| 2016/0070602 A1* | 3/2016 | Shimogawa | G06F 9/45558 718/1 |
| 2016/0117117 A1 | 4/2016 | Heller | |
| 2016/0179399 A1 | 6/2016 | Melik-Martirosian | |
| 2016/0188219 A1* | 6/2016 | Peterson | G06F 3/0616 711/103 |
| 2016/0210060 A1 | 7/2016 | Dreyer | |
| 2017/0060428 A1 | 3/2017 | Lee et al. | |

(Continued)

*Primary Examiner* — Kalpit Parikh
(74) *Attorney, Agent, or Firm* — Taylor English Duma LLP

(57) ABSTRACT

A method operable with the storage device includes determining a workload to the storage device based on host Input/Output (I/O) requests to the storage device. When the workload is above a threshold, a first portion of the storage device is selected for garbage collection based on the I/O requests. Otherwise, when the workload is below the threshold, a second different portion of the storage device is selected for garbage collection based on a storage ability of the second portion of the storage device.

17 Claims, 9 Drawing Sheets

(56) References Cited

U.S. PATENT DOCUMENTS

| | | |
|---|---|---|
| 2017/0109276 A1 | 4/2017 | Lee |
| 2017/0123718 A1* | 5/2017 | Sinha .................... G06F 3/0608 |
| 2017/0123974 A1 | 5/2017 | Yi |
| 2017/0133107 A1 | 5/2017 | Ryan et al. |
| 2017/0139603 A1 | 5/2017 | Byun |
| 2017/0147239 A1 | 5/2017 | Lee |
| 2017/0147503 A1 | 5/2017 | Silva |

* cited by examiner

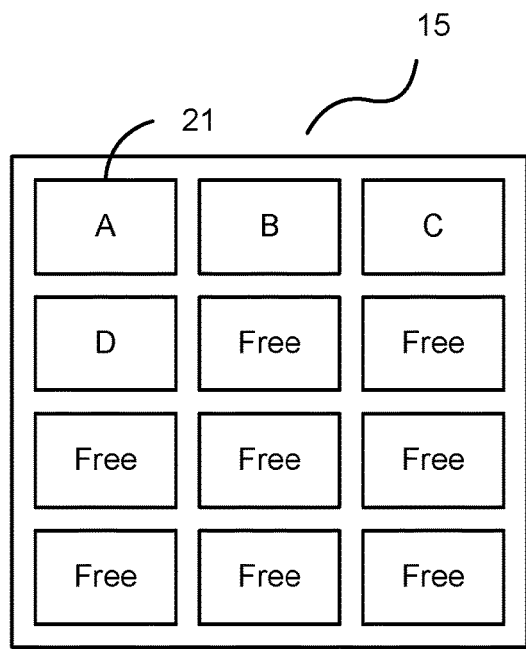
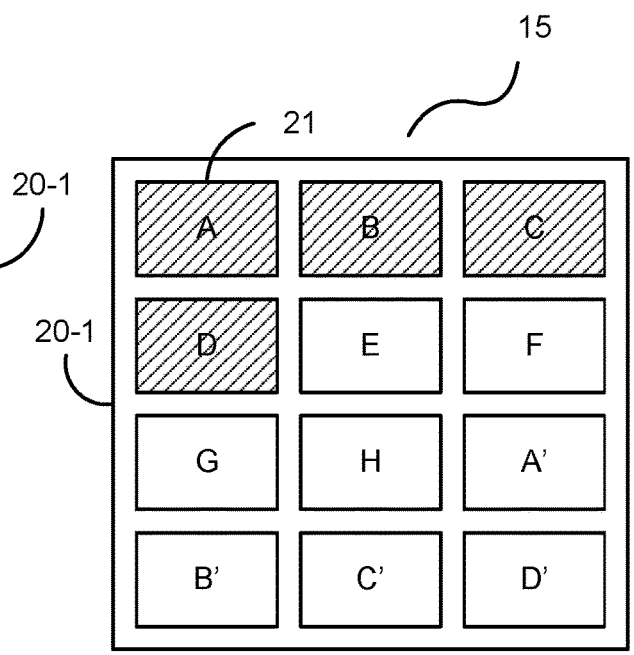
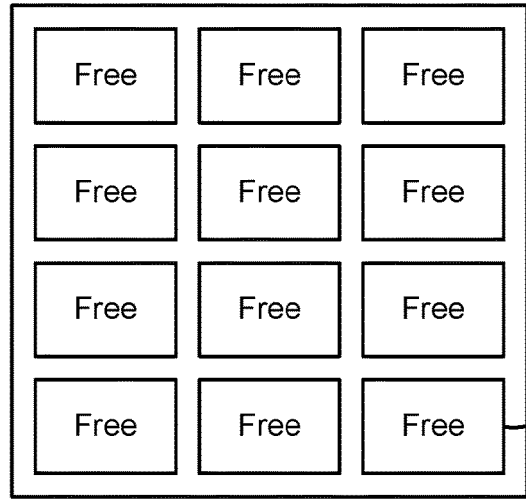
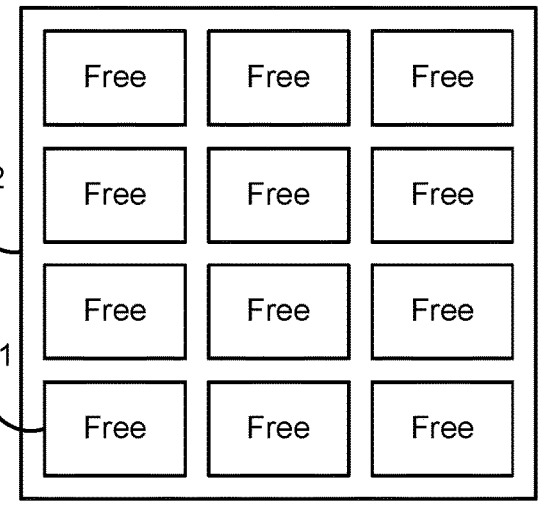
*FIG. 2A*
*FIG. 2B*

GARBAGE COLLECTION OF A STORAGE DEVICE

SUMMARY

Systems and methods presented herein provide for adaptive garbage collection of a storage device. In one embodiment, a method operable with the storage device includes determining a workload to the storage device based on host Input/Output (I/O) requests to the storage device. When the workload is above a threshold, a first portion of the storage device is selected for garbage collection based on the I/O requests. Otherwise, when the workload is below the threshold, a second different portion of the storage device is selected for garbage collection based on a storage ability of the second portion of the storage device.

The various embodiments disclosed herein may be implemented in a variety of ways as a matter of design choice. For example, the system and method embodiments hereof may take the form of computer hardware, software, firmware, or combinations thereof. Other exemplary embodiments are described below.

BRIEF DESCRIPTION OF THE FIGURES

Some embodiments are now described, by way of example only, and with reference to the accompanying drawings. The same reference number represents the same element or the same type of element on all drawings.

FIGS. 2A-2C illustrate an exemplary garbage collection of the storage system of FIG. 1.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody certain principles that are included within the scope of the embodiments. Furthermore, any examples described herein are intended to aid in understanding the principles of the embodiments and are to be construed as being without limitation to such specifically recited examples and conditions. As a result, the embodiments are not limited to any specific examples described below.

Figure 1:
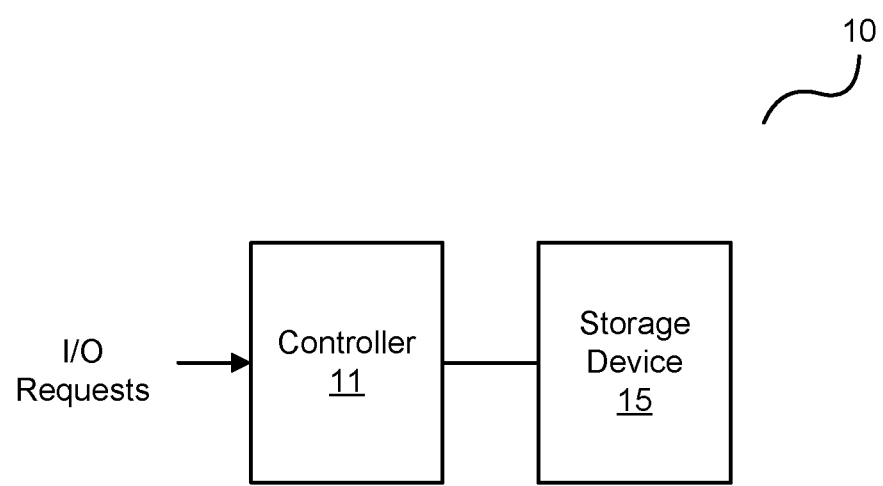
FIG. 1 is a block diagram of an exemplary storage system employing adaptive garbage collection.

FIG. 1 is a block diagram of an exemplary storage system 10 that is operable to store and read data resulting from I/O requests (e.g., from a host system shown below). The storage system 10 comprises a controller 11 that controls the how and where the data is persistently stored on a storage device 15. The controller 11 is also operable to perform certain operations on the storage device 15 to ensure data integrity and performance of the storage device 15, such as error correction coding (ECC) and garbage collection. For example, some data storage devices, such as Solid State Drives (SSDs), do not employ moving mechanical components like a Hard Disk Drive (HDD) does. Instead, these storage devices use integrated circuitry as memory cells to persistently store data. The memory cells are arranged in "pages", which are arranged in "blocks". And, the blocks are arranged on a "plane" of a die. The controller 11 in such a case writes data to the pages of the blocks and manages how and where that data is stored and changed via subsequent I/O requests.

Figure 2C:
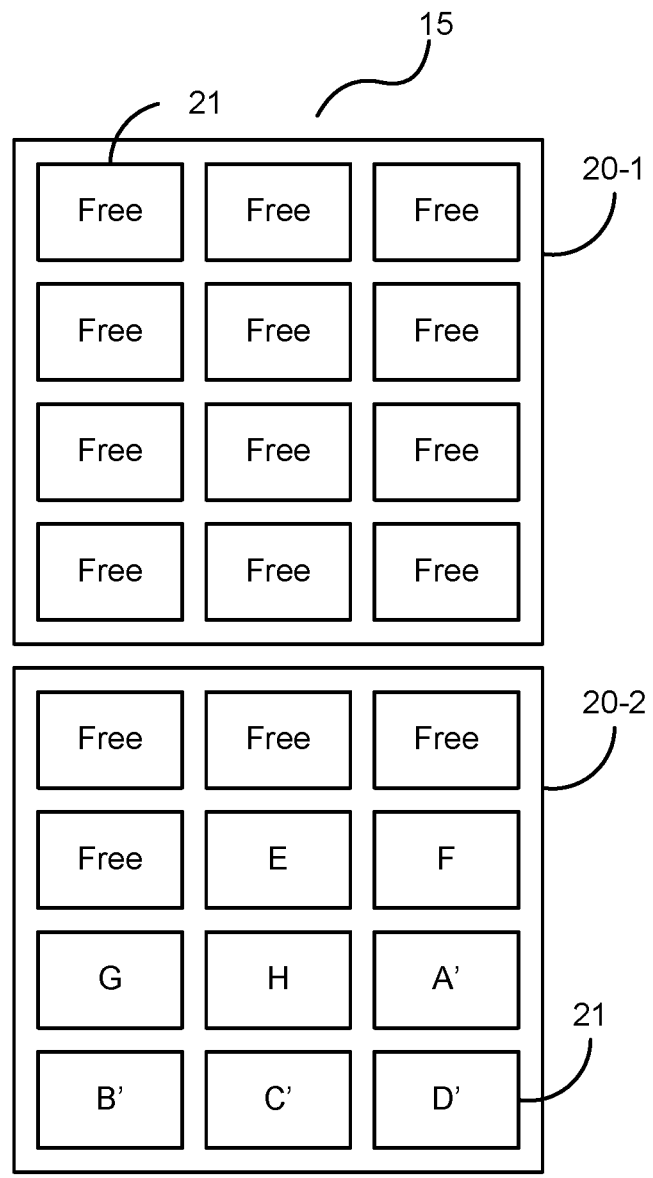

To illustrate, FIGS. 2A-2C shows two exemplary blocks 20-1 and 20-2 of the storage device 15. When a write I/O request is received by the controller 11, the controller 11 processes the I/O request and stores the data in individual pages 21 of a storage block 20 (e.g., data pages A, B, C, and D), as illustrated in the storage block 20-1 of FIG. 2A. The remaining pages, marked as "free", are open to store data as determined by the controller 11.

When a subsequent I/O request causes changes and additions to the data pages 21, the controller 11 writes the new data to other pages 21 of the block 20-1 (e.g., data pages E, F, G, and H), as illustrated in FIG. 2B. The changed A, B, C, and D data resulting from the I/O request is written to other pages 21 as A', B', C', and D' data, and the original A, B, C, and D data is marked as invalid (shown by hatching of the A, B, C, and D in the data pages 21). Now, as illustrated in FIG. 2B, the block 20-1 is full. And, while certain pages 21 of the block 20-1 are invalid, nothing else can be written to the block 20-1 until it is erased.

So, the controller 11, from time to time, seeks to free up space in the storage device 15 by relocating valid data to other blocks, such as the block 20-2 of FIG. 2C. Here, the controller writes the data pages 21 containing the changed A', B', C', and D' data as well as the E, F, G, and H data, leaving the block 20-2 with free pages for writing. Once the A', B', C', D', E, F, G, and H data is written to the block 20-2, the controller 11 erases the block 20-1, thereby freeing the pages 21 of that block for subsequent writing. This relocation of data and erasing is a process generally referred to as garbage collection.

While this process is widely used in SSD architectures (e.g., NAND flash), it also has value in other types of storage devices, such as shingled magnetic recording (SMR) mediums where tracks are shingled upon one another to increase data storage capacity. For example, a write head of an SMR drive overlaps tracks of an SMR drive. Thus, when writing to one track of the SMR drive, the write head may disturb the data of an adjacent track. So, the SMR drive marks the disturbed data as invalid and performs a similar garbage collection on those tracks.

In some embodiments, the storage device 15 may be configured using one or more SSD architectures, such as Single Level Cell (SLC) architectures and Multi-Level Cell (MLC) architectures. An SLC architecture allows a memory cell to store one bit of data. Traditionally, an MLC architecture meant that a memory cell could store two bits of data. But, architectures have evolved and now provide even higher levels of density, such as Triple Level Cell (TLC) architectures that store three bits per memory cell, and Quad Level Cell (QLC) architectures that store four bits per memory cell. Generally, though, any architecture storing more than one bit of data per cell may also be referred to as an MLC architecture.

Each memory cell of the storage device 15 may be configured like a Metal Oxide Semiconductor Field Effect Transistor (MOSFET) with a control gate. But, each memory cell also has a floating gate surrounded by an insulating oxide layer configured between the control gate and the channel of the MOSFET. Because the floating gate is electrically isolated by its insulating layer, electrons placed on it are trapped until they are removed by an application of an electric field (e.g., an applied voltage). Placing electrons on the floating gate sets the transistor to the logical "0" state. Once the floating gate is charged, the electrons in it screen the electric field from the control gate, thereby increasing the threshold voltage of the memory cell. This means that a higher voltage is applied to the control gate to make the channel of the transistor conductive.

In order to write a value from the transistor, an intermediate voltage between the threshold voltages is applied to the control gate. If the channel conducts at this intermediate voltage, the floating gate is uncharged and causes a logical "1" to be stored in the memory cell. If the channel does not conduct at the intermediate voltage, it indicates that the floating gate is charged causing a logical "0" to be stored in the memory cell. The presence of a logical "0" or a logical "1" is sensed, or "read", by determining whether there is current flowing through the transistor when the intermediate voltage is asserted on the control gate.

Regardless of the architecture (e.g., SLC, MLC, etc.), memory cells are generally arranged in pages typically comprising thousands of cells in a single page. For example, a single page of an SLC flash device may comprise 16,384 memory cells capable of storing 16,384 bits of data, or 16 kilobytes (kB). A single page of a 2-bit MLC flash device may comprise 8,192 memory cells capable of storing the same amount of data. Typical page sizes include 2 kB, 4 kB, 8 kB, and 16 kB. The pages of a flash device are arranged in blocks with each block routinely comprising 128 or 256 pages. Thus, each block in a flash device can vary between 256 kB and 4 megabytes (MB). When data is to be written to a flash device, the controller 11 programs the device on a page-by-page basis until a block is full. Once the block of a flash device is full, the block is closed until the controller 11 performs an erasure process on the block (e.g., as explained above). However, it should be noted that the embodiment is not intended to be limited to any page size or block size as these features are constantly changing as the technology progresses.

It should be noted that, while the I/O requests can and often do come directly from a host system, the I/O requests may be cached in another device, such as a buffer, before being executed by the controller 11, or may even be issued by other storage devices themselves. Accordingly, the embodiment is not intended to be limited to any particular type of I/O request.

Based on the foregoing, the controller 11 is any device, system, software, firmware, or combination thereof operable to service I/O requests to read data from and write data to the storage device 15 and to maintain the integrity of the data in the storage device 15.

Figure 3:
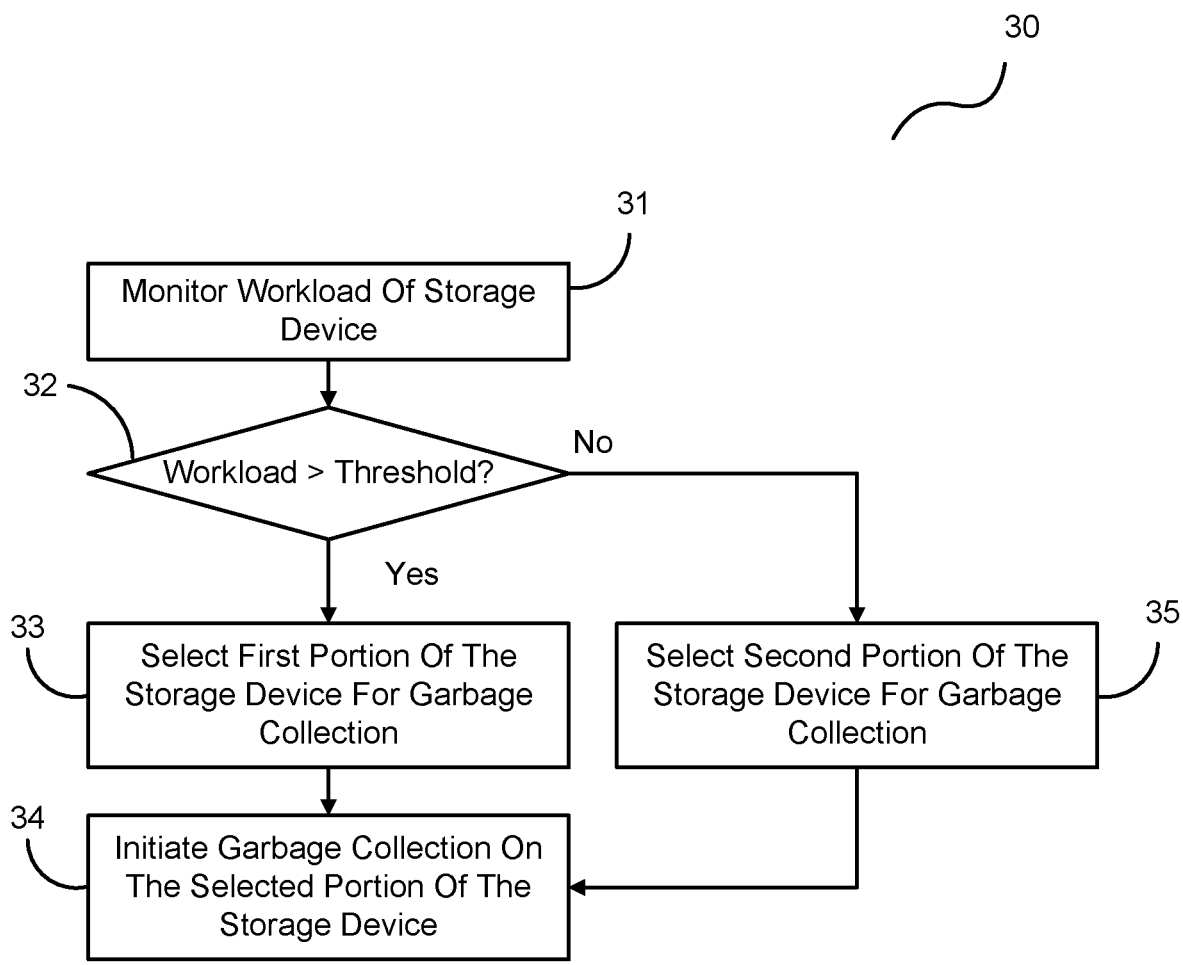
FIG. 3 is a flowchart of an exemplary process of the storage system of FIG. 1.

FIG. 3 is a flowchart of an exemplary process 30 of the storage system 10 of FIG. 1. In this embodiment, the storage system 10 is in operation and the controller 11 is processing I/O requests to the storage device 15. In doing so, the controller 11 monitors the workload of the storage device 15, in the process element 31. For example, the controller 11 may monitor the size and frequency of I/O requests being received.

If the workload of the storage device 15 is greater than some predetermined threshold (process element 32), then the controller 11 selects a first portion of the storage device 15 to perform garbage collection, in the process element 33. For example, if the controller 11 determines that the workload of the storage device 15 is relatively high, then the controller may seek to relocate data from blocks 20 of the storage device 15 where garbage collection is relatively fast so as to not impede the performance of the storage device 15.

If, on the other hand, the workload of the storage device 15 is lower than the predetermined threshold (process element 32), then the controller 11 selects a second portion of the storage device 15 to perform the garbage collection, in the process element 35. For example, if the controller 11 determines that the workload of the storage device 15 is relatively low, then the controller 11 can spend more time performing garbage collection. In this regard, the controller 11 may seek to free up blocks 20 of the storage device 15 that provide the largest data storage capacity.

In any case, once the controller 11 selects a portion of the storage device 15 for garbage collection, the controller 11 initiates garbage collection on the selected portion of the storage device 15, in the process element 34 (e.g., in a manner as described above).

Figure 4:
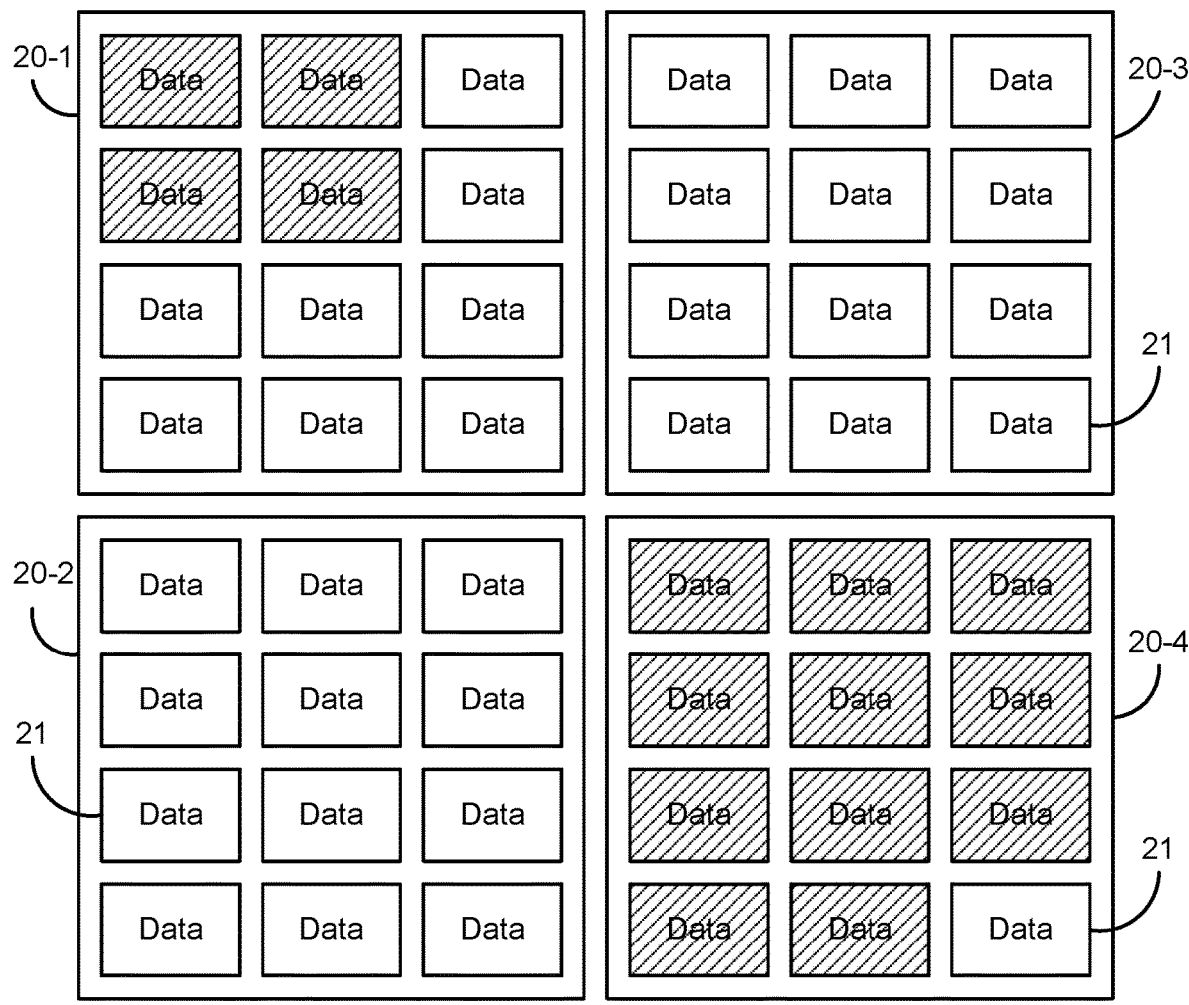
FIGS. 4-6 illustrate additional exemplary garbage collections of the storage system of FIG. 1.

To illustrate, FIG. 4 is an exemplary layout of blocks 20-1-20-4 of the storage device 15, each comprising a plurality of pages 21. Some of the pages 21 in this embodiment contain invalid data, as again represented by the hatchings. If the controller 11 determines that the storage device 15 is experiencing a relatively high number of I/O requests, the controller 11 may search the storage device 15 for blocks 20 with the largest amount of invalid data, in this instance the block 20-4, because the controller 11 relocates a lesser amount of valid data. For example, the blocks 20-2 and 20-3 all contain pages 21 of valid data so garbage collection is not needed for those blocks at this time. However, the blocks 20-1 and 20-4 each contain a number of invalid data pages 21. And, the block 20-1 has more valid data to relocate than the block 20-4 has. Accordingly, the controller 11 may relocate the valid data in the page 21 at the block 20-1 and perform garbage collection thereon more quickly. In other words, when a garbage collection process is to be performed, valid data of a block 20 is relocated and then the entire block 20 is erased. As the erasure time is generally the same for any given block 20, the garbage collection process is expedited because it is faster to relocate valid data of fewer pages.

Figure 5:
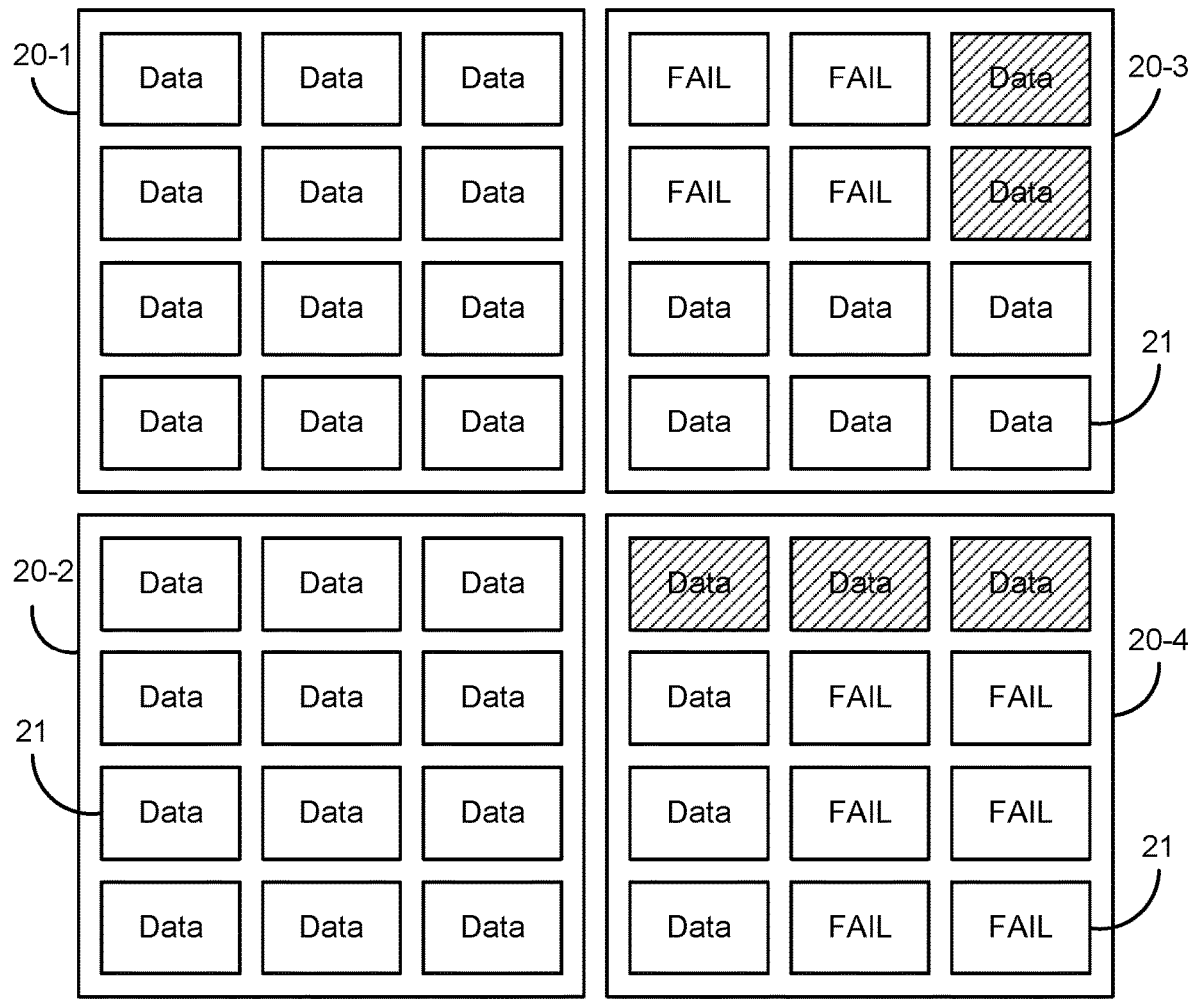

Alternatively or additionally, the controller 11 may perform garbage collection based on a number of failed or failing pages of a particular block 20 and the workload of the storage device 15. For example, FIG. 5 exemplarily illustrates the blocks 20-1-20-4 with the pages 21 comprising valid data, invalid data, and failed pages. More specifically, the block 20-3 is exemplarily illustrated with four failed pages 21, two pages 21 of invalid data, and six pages 21 of data that can be relocated. The block 20-4 is exemplarily illustrated with six failed pages 21, three pages 21 of invalid data, and three pages of validated that can be relocated. The blocks 20-1 and 20-2 are filled with pages 21 of valid data.

The controller 11, in evaluating the workload of the storage device 15, may evaluate the I/O requests being received to determine the data storage capacity needed to fulfill those requests. For example, assume that the controller 11 receives one or more I/O requests that need only three pages of data storage capacity. The storage controller 11 may determine which of the blocks 20-3 and 20-4 to perform garbage collection on, as the blocks 20-1 and 20-2 comprise pages 21 with valid data and are not necessarily eligible for garbage collection at this time. The controller 11 may determine which of the blocks 20-3 and 20-4 better serves the three pages of data storage capacity.

Both of the blocks 20-3 and 20-4 can meet the needs of the three pages of data storage capacity. But, the block 20-3 will provide eight pages 21 of data storage capacity after garbage collection, while also relocating six pages 21 of valid data. The block 20-4, on the other hand, can only provide six pages 21 of data storage capacity after garbage collection. But, the block 20-4 meets the three-page data storage capacity needs of the workload and only needs to relocate three pages 21 of valid data. As the garbage collection process on the block 20-4 meets the three-page data storage capacity need of the workload and because that garbage collection process will be faster than a garbage collection of the block 20-3, the controller 11 selects the block 20-4 for garbage collection.

Now assume that the workload of the storage device 15 needs eight pages 21 of data storage capacity. In this case, the controller 11 may select the block 20-3 to fulfill the I/O requests because garbage collection on the block 20-4 would not provide the requisite data storage capacity to fulfill the I/O requests. Accordingly, the controller 11 adaptively performs garbage collection to meet the needs of the workload.

Alternatively or additionally, the controller 11 may select a number of blocks 20 to fulfill a workload. For example, assume now that the controller 11 needs 24 pages 21 of data to fulfill the I/O demand. As the storage device 15 typically comprises many more blocks 20 and many more pages 21 per block 20 than illustrated, the controller 11 may scan the storage device 15 for candidate blocks 20 having the data storage capacity that is either equal to or less than the data storage capacity needs of the I/O demand. In this regard, the controller 11 may accumulate a number of blocks 20 that will meet the needs of the I/O demand and begin performing garbage collection on those blocks 20 in a manner that provides the fastest way to meet the I/O demand.

Although discussed with respect to failed pages 21, the controller 11 may also make block selection decisions based on ECC rates of certain pages 21 (e.g., failing pages). For example, over time, writes and garbage collections have a tendency to wear out pages 21 of the blocks 20, creating errors when reading data. The controller 11 then lowers the ECC rate (e.g., increasing the ECC of the data). The controller 11 may take this into consideration and select those blocks 20 for garbage collection in advance of an anticipated workload increase. In other words, the controller 11 may preemptively select blocks 20 for garbage collection based on a predicted workload (e.g., a predicted data storage capacity requirement) because the controller 11 can determine a duration of time needed to perform a garbage collection on a block 20 or a set of blocks.

Of course, the controller 11 may predict workloads and select blocks 20 for garbage collection in other ways. For example, the controller 11 may also select blocks 20 based on an ability to create larger data storage capacity according to a time of day. To illustrate, in FIG. 6, the storage device 15 is exemplarily illustrated with the blocks 20-1-20-4 each comprising one page 21 of invalid data. As discussed, when the workload is relatively high, the controller 11 may seek out blocks with less data storage capacity to expedite the garbage collection and improve performance of the storage device 15 during the workload. However, when the workload is relatively low, the controller 11 may look to perform garbage collection on the blocks 20 that provide larger amounts of data storage capacity in anticipation of higher data storage capacity workloads. In this regard, the controller 11 may seek to perform garbage collection on the blocks 20-1-20-4 of the storage device 15 as they would free up 48 pages of data storage capacity.

Figure 6:
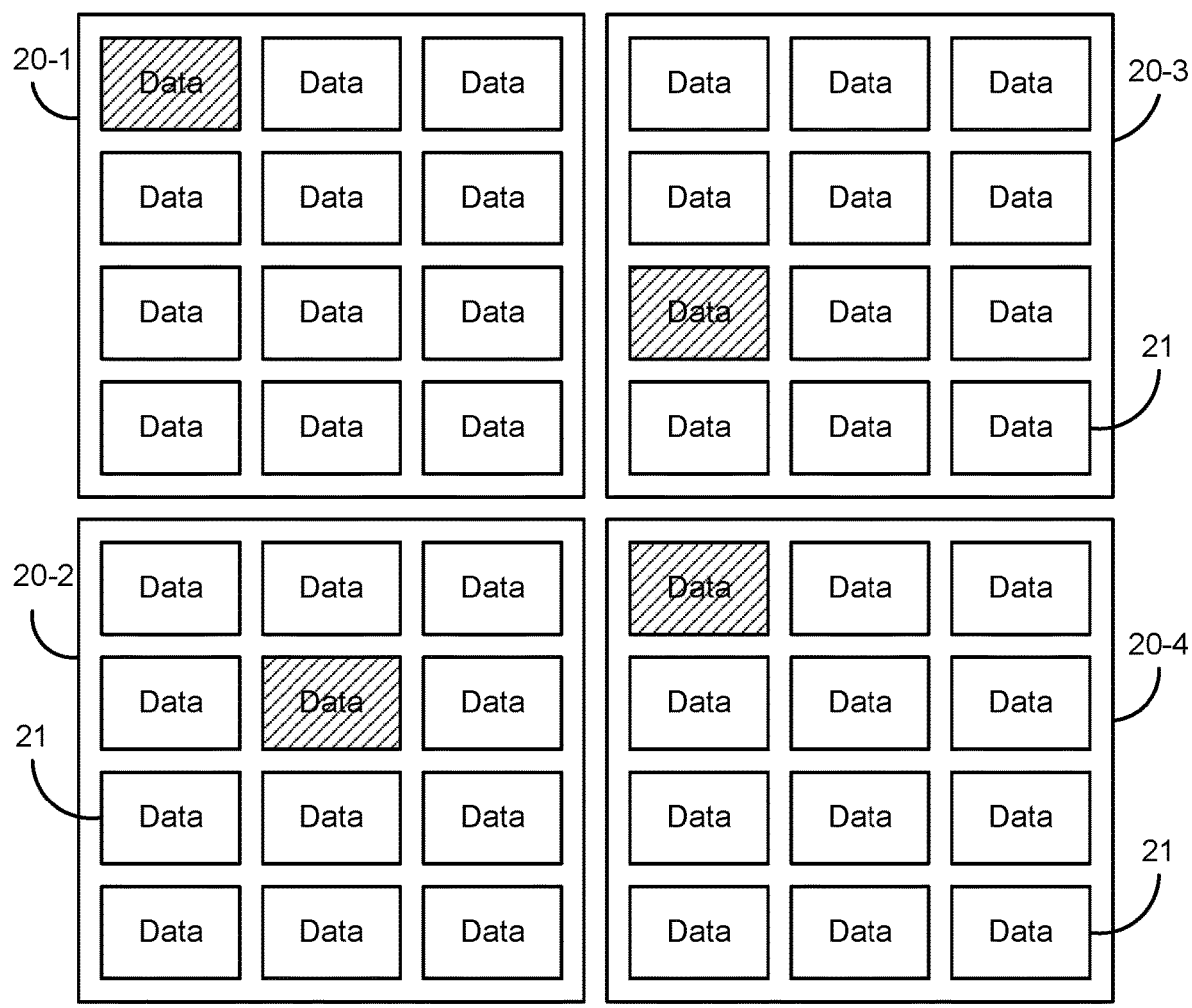

Even though the controller 11 would still need to relocate the valid data from the pages 21 from the blocks 20-1-20-4 (e.g., 44 pages) of FIG. 6, the relocation could be used as part of a wear leveling process. For example, to even out the wear distribution of the storage device 15, the controller 11 may relocate the valid data pages 21 in other blocks with less wear (e.g., due to write amplification) such that ECC could be applied more evenly across several blocks 20. In any case, the larger amount of data storage capacity is freed for subsequent increased workload.

While various forms of garbage collection decisioning have been shown and described, the embodiments are not intended to be limiting. The controller 11 may adaptively perform garbage collection in a variety of ways as a matter of design choice. For example, the controller 11 may use a number of I/O requests, a data storage capacity required by the I/O requests, any number of valid data blocks needing relocation, ECC, wear levels of the blocks, etc. as part of a multi-input adaptive algorithm for selecting blocks for garbage collection.

It should be noted that the process embodiments herein are exemplary and not intended to be limiting. The process elements thereof may be rearranged or changed while still embodying the principles of adaptive garbage collection disclosed herein.

Figure 7:
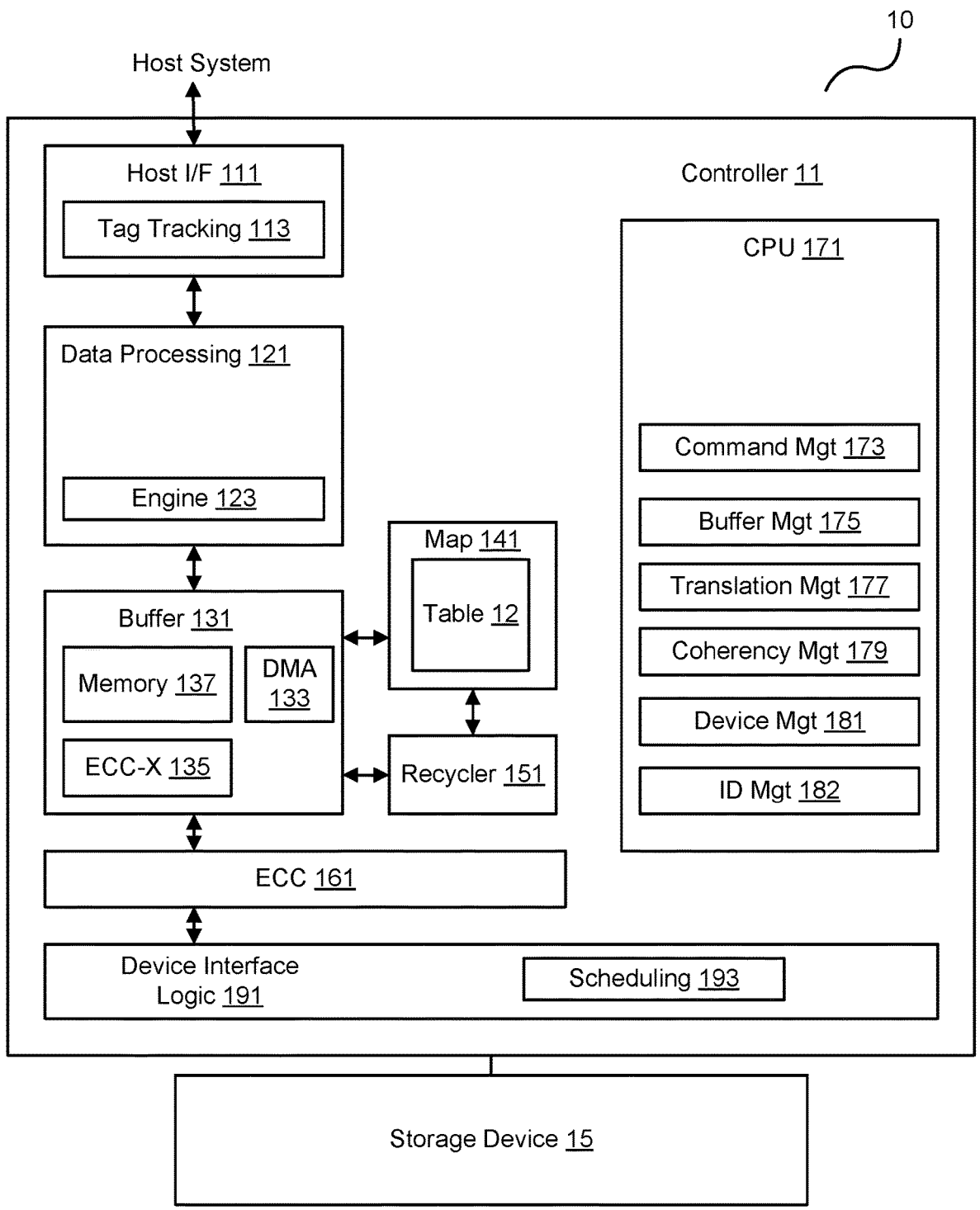
FIG. 7 is a block diagram of an exemplary storage controller and its associated storage device.
Figure 8:
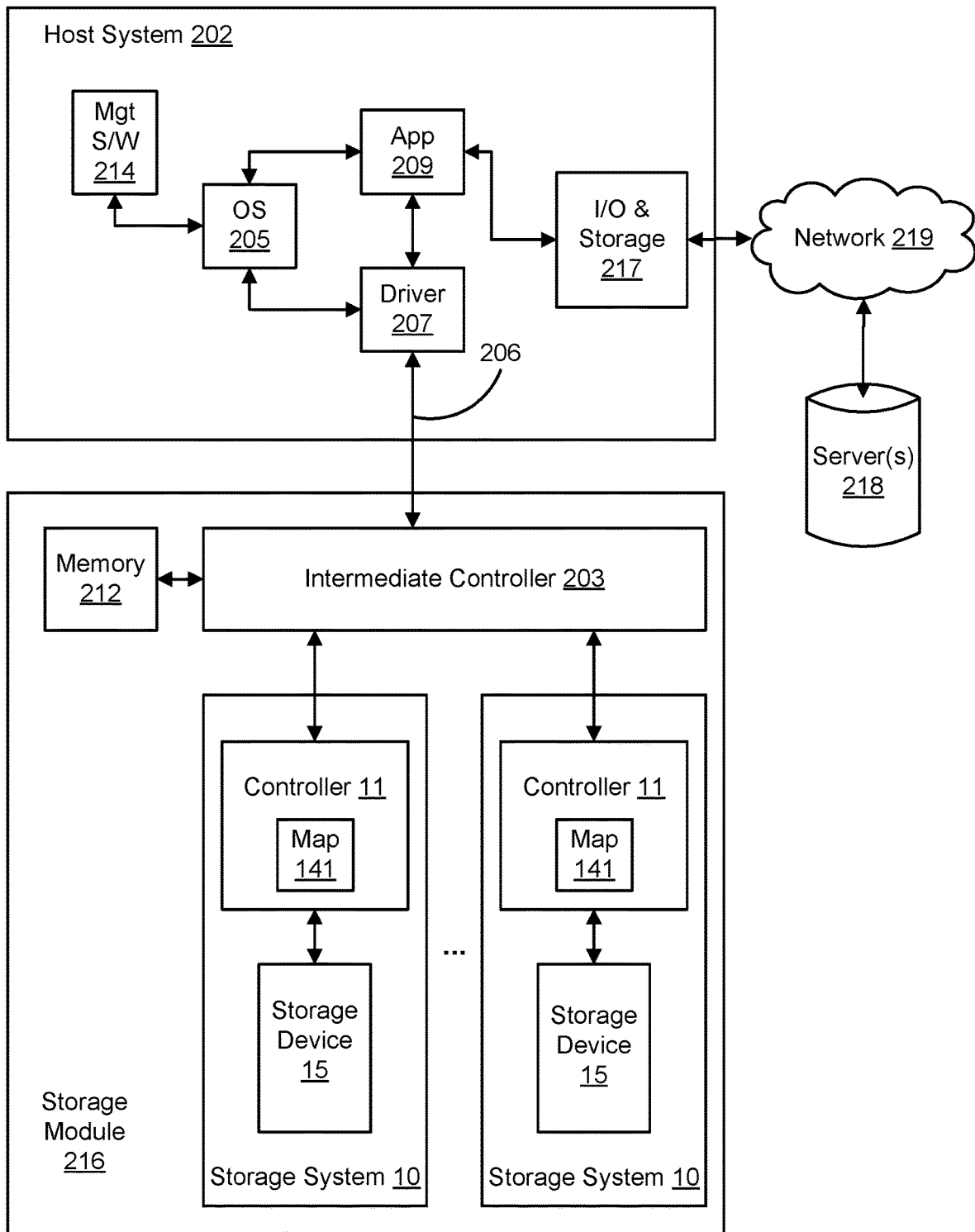
FIG. 8 is a block diagram of an I/O module comprising storage devices and their associated controllers interfacing with a host system.

The embodiments herein can take the form of hardware, firmware, software, or a combination thereof. FIGS. 7 and 8 illustrate such a combination that may be operable to employ the systems and methods described herein. More specifically, FIG. 7 is a block diagram of an exemplary storage system 10 and its associated device controller (e.g., the controller 11) and storage device 15. FIG. 8 is a block diagram of a storage module 216 comprising storage systems 10 and their associated controllers 11/storage devices 15 interfacing with a host system 502.

In FIG. 7, the controller 11 includes a host interface 111 that is operable to interface with a host system to communicate I/O operations of the host system. The host interface 111 may be configured with a tag tracking module 113 that is operable to track progress of individual I/O commands (e.g., read and write commands to certain addresses in the storage device 15). The tag tracking module 113 may associate an external flag of a command received from the host system with an internal flag that the controller 11 can access during processing of the command to identify the status of the processing.

The controller 11 also includes a data processing module 121 that comprises a processing engine 123 generally operable to perform certain tasks on data that is received from the host interface 111 or residing within a buffer 131, such as one or more of formatting the data, transcoding the data, compressing the data, decompressing the data, encrypting the data, decrypting the data, data encoding/formatting, or any combination thereof. For example, a processing engine 123 of the data processing module 121 may be operable to process the I/O operation from an I/O module of the host system generating the operation, such that the data of the I/O operation may be written to the logical address of the storage device 15. The processing engine 123 may extract the data of the write I/O command and prepare it for storage in the storage device 15. In doing so, the processing engine 123 may compress the data using any of a variety of data compression algorithms. When retrieving the data from the storage device 15, the processing engine 123 may decompress the data according to the algorithm used to compress the data for storage.

The buffer 131 is operable to store data transferred to and from the host system. The buffer 131 may also store system data, such as memory tables used by the controller 11 to manage the storage device 15, and any possible higher-level RAID functionality in the memory 137. Other modules may include an error correcting code (ECC-X) module 135 to provide higher-level error correction and redundancy functionality, and a Direct Memory Access (DMA) module 133 to control movement of data to and from the buffer 131.

The controller 11 also includes an error correction code module 161 operable to provide lower level error correction and redundancy processing of the data in the buffer 131 using any of a variety of error correction codes techniques (e.g., cyclic redundancy checks, Hamming codes, low-density parity check coders, etc.).

A device interface logic module 191 is operable to transfer data to and from the storage device 15 according to the protocol of the devices therein. The device interface logic module 191 includes a scheduling module 193 that is operable to queue I/O operations to the storage device 15.

The controller 11 herein also includes a map module 141 that is operable to perform data addressing to locations in the storage device 15 according to the lookup table 12. For example, the map module 141 may use the lookup table 12 to convert logical block addresses (LBAs) from the host system to block/page addresses directed to the storage device 15. The lookup table 12 may be stored in whole or in part in controller 11 and/or in storage device 15. For example, in some embodiments a portion of the lookup table 12 may be cached in the controller 11 with generally all of lookup table 12 being stored non-volatilely in the storage device 15.

A recycler 151 performs garbage collection on behalf of the controller 11. For example, the recycler 151 may determine portions of the storage device 15 that are actively in use by scanning the lookup table 12 of the map module 141. In this regard, the recycler 151 may make unused, or "deallocated", portions of the storage device 15 available for writing by erasing the unused portions. The recycler 151 may also move data within the storage device 15 to make larger contiguous portions of the storage device 15 available for writing.

The controller 11 also includes a CPU 171 that controls various aspects of the controller 11. For example, the CPU 171 may process instructions or firmware to implement command management 173 that tracks and controls commands received from the host system. This firmware may also implement buffer management 175 that controls allocation and use of the buffer 131 and translation management 177 or to control the map module 141. The firmware may also employ coherency management 179 to control consistency of data addressing to avoid conflicts such as those that may occur between external data accesses and recycled data accesses. The firmware may also provide device management 181 to control the device interface logic module 191 and identity management 182 to control modification and communication of identity information of components within the controller 11.

In FIG. 8, the host system 202 is operable to process software instructions and perform I/O operations with the storage module 216 to read from and write to one or more storage systems 10. In this regard, the host system 202 may include an operating system 205 that provides the computing environment for the host system 202. A driver 207 is operable to communicate through the link 206 to the storage module 216 to perform the I/O operations with the various storage systems 10 configured therewith.

Like other computing systems, the operating system 205 may be initiated via management software 214 (e.g., Bios software). The host system 202 may also include application software 209 to perform various computing processes on behalf of the host system 202 (e.g., word processing applications, image processing applications, etc.). The host system 202 may also include I/O and storage functionality 217 operable to conduct I/O operations with one or more servers 218 through a communication network 219 (e.g., the Internet, local area networks, wide-area networks, etc.). In this regard, the storage module 216 may act as a cache memory of I/O operations for the host system 202.

The storage module 216 may be configured with an intermediate controller 203 that is operable to switch various I/O operations of the host system 202 to LBAs of the storage systems 10. In this regard, the storage module 216 may include a memory 212 that stores mapping information for the intermediate controller 203 to conduct the I/O operations to the LBAs. The map module 141 of the controller 11 may also be operable to perform data addressing with variable-sized mapping units to locations in the storage device 15 according to the lookup table 12, and convert LBAs from the host system 202 to block/page addresses directed to the storage device 15.

It should be noted that the embodiments disclosed herein are not limited to any type of storage device 15 as such may be implemented in other persistent storage devices, including HDDs, SSDs, magnetoresistive storage devices, or the like.

What is claimed is:

1. A method operable with a storage device, the method comprising:
   determining a workload of the storage device based on a size and frequency of I/O requests received by the storage device from a host system;
   determining whether the workload is above a threshold;
   if the workload is above the threshold, selecting a first portion of the storage device for garbage collection, the first portion comprising blocks of the storage device where garbage collection will occur relatively fast; and
   if the workload is below the threshold, selecting a second different portion of the storage device for garbage collection, the second portion comprising blocks of the storage device where garbage collection will provide a largest data storage capacity.

2. The method of claim 1, wherein:
   the storage device is a NAND flash storage device, a magnetoresistive storage device, a magnetic recording medium, or a combination thereof.

3. The method of claim 1, wherein selecting the first portion of the storage device further comprises selecting blocks of the storage device having a data storage capacity required by the I/O requests.

4. The method of claim 1, further comprising:
   predicting the workload; and
   selecting a third portion of the storage device for garbage collection in anticipation of the predicted workload.

5. The method of claim 4, further comprising:
   predicting the workload based on a time of day.

6. The method of claim 1, wherein selecting the first portion of the storage device comprises selecting one or more blocks of the storage device with a largest amount of invalid data.

7. A non-transitory computer readable medium comprising instructions that, when executed by a controller of a storage device, direct the controller to:
   determine a workload of the storage device based on a size and frequency of I/O requests received by the storage device from a host system;
   determine whether the workload is above a threshold;

if the workload is above the threshold, select a first portion of the storage device for garbage collection, the first portion comprising blocks of the storage device where garbage collection will occur relatively fast; and if the workload is below the threshold, select a second different portion of the storage device for garbage collection, the second portion comprising blocks of the storage device where garbage collection will provide a largest data storage capacity.

8. The computer readable medium of claim 7, wherein:

the storage device is a NAND flash storage device, a magnetoresistive storage device, a magnetic recording medium, or a combination thereof.

9. The computer readable medium of claim 7, wherein selecting the first portion of the storage device further comprises selecting blocks of the storage device having a data storage capacity required by the I/O requests.

10. The computer readable medium of claim 7, further comprising instructions that direct the controller to:

predict the workload; and select a third portion of the storage device for garbage collection in anticipation of the predicted workload.

11. The computer readable medium of claim 10, further comprising instructions that direct the controller to:

predict the workload based on a time of day.

12. The computer readable medium of claim 7, wherein selecting the first portion of the storage device comprises selecting one or more blocks of the storage device with a largest amount of invalid data.

13. A system, comprising:

a storage device operable to persistently store data; and a controller operable to determine a workload of the storage device based on a size and frequency of I/O requests received by the storage device from a host system, and when the workload is above a threshold, select a first portion of the storage device for garbage collection, the first portion comprising blocks of the storage device where garbage collection will occur relatively fast, else when the workload is below the threshold, select a second different portion of the storage device for garbage collection based on a storage ability of the second portion of the storage device, the second portion comprising blocks of the storage device where garbage collection will provide a largest data storage capacity.

14. The system of claim 13, wherein:

the storage device is a NAND flash storage device, a magnetoresistive storage device, a magnetic recording medium, or a combination thereof.

15. The system of claim 13, wherein selecting the first portion of the storage device further comprises selecting blocks of the storage device having a data storage capacity required by the I/O requests.

16. The system of claim 13, wherein:

the controller is further operable to predict the workload based on a time of day, and to select a third portion of the storage device for garbage collection in anticipation of the predicted workload.

17. The system of claim 13, wherein selecting the first portion of the storage device comprises selecting one or more blocks of the storage device with a largest amount of invalid data.

* * * * *